Sept. 15, 1970     J. E. JOHNSON ET AL     3,528,210

MANHOLE GRATE

Filed Nov. 12, 1968     3 Sheets-Sheet 1

INVENTORS.
John E. Johnson
Archibald T. Flower
BY

Paul & Paul

ATTORNEYS.

Sept. 15, 1970          J. E. JOHNSON ET AL          3,528,210
                          MANHOLE GRATE
Filed Nov. 12, 1968                            3 Sheets-Sheet 2
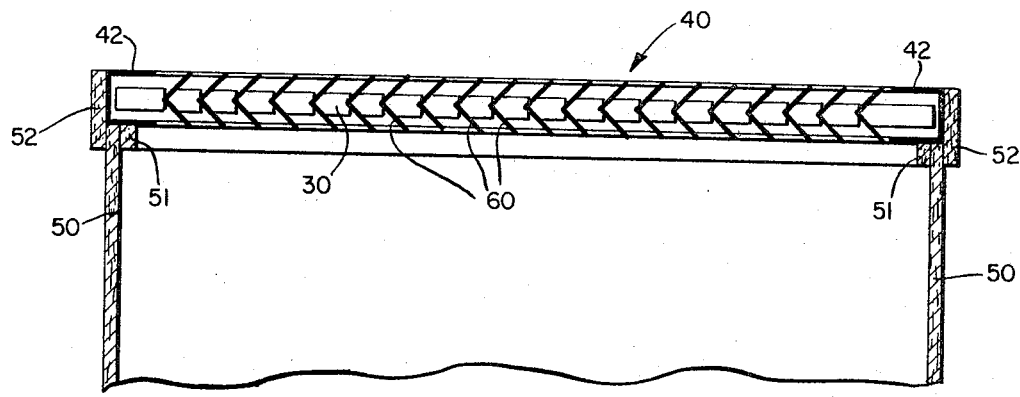
Fig. 7
Fig. 8
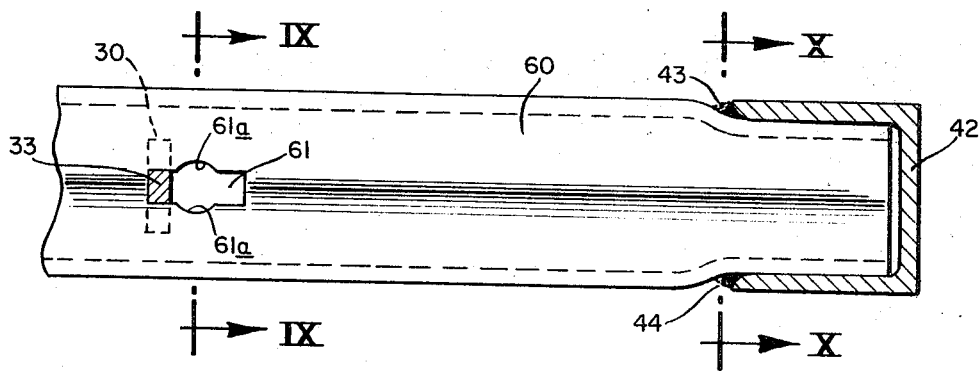
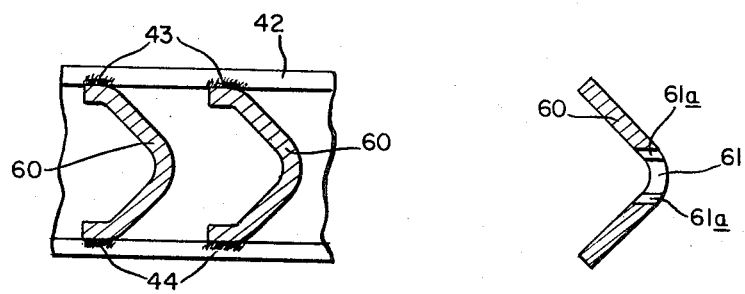
Fig. 10            Fig. 9
INVENTORS.
John E. Johnson
BY  Archibald T. Flower
Paul & Paul
ATTORNEYS.

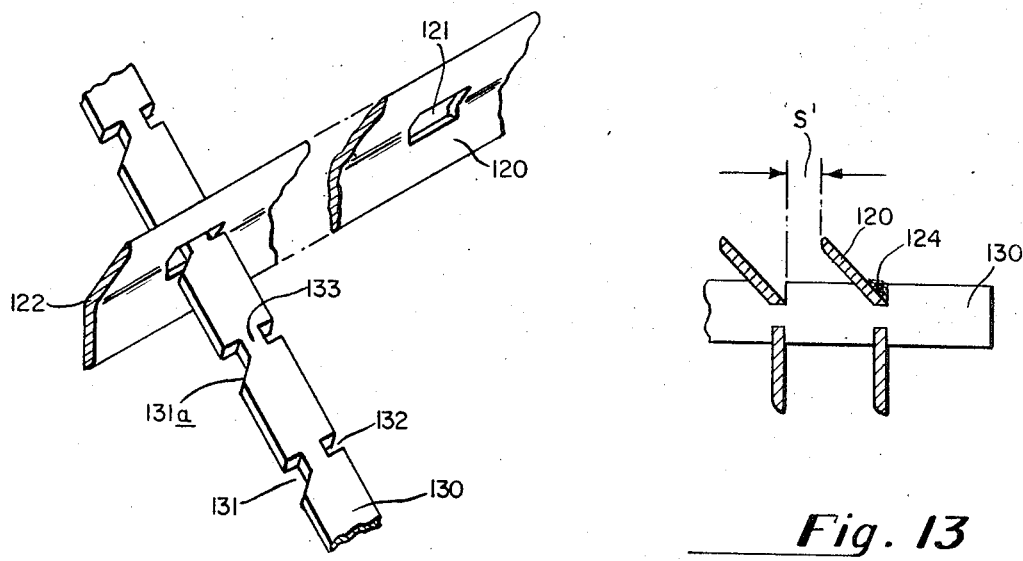
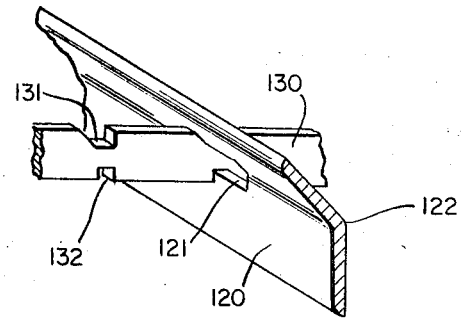

United States Patent Office 3,528,210
Patented Sept. 15, 1970

3,528,210
MANHOLE GRATE
John E. Johnson, 110 W. Clearfield Road, Havertown,
Pa. 19083, and Archibald T. Flower, Gwynedd, Pa.;
said Flower assignor to said Johnson
Filed Nov. 12, 1968, Ser. No. 774,817
Int. Cl. E04c 5/04, 2/42
U.S. Cl. 52—656                                        14 Claims

ABSTRACT OF THE DISCLOSURE

A manhole grate is provided for a transformer manhole in an electric power residential distribution system. The grate has a circular rim and a series of parallel closely-spaced angle bars extending between opposing edges of the rim and supported on the rim flange. A plurality of tie rods extend in an orthogonal direction relative to the angle bars, and pass through openings in the angle bars. The angle bars are so disposed angularly, relative to the longitudinal axis of the angle bar, that the two end edges of each bar lie in the same vertical plane, with the vertex of the next adjacent angle bar in a vertical plane closely spaced from the first-mentioned vertical plane. The openings in the angle bars through which the tie rods pass are located in the vertex region of the bars. The tie rods have opposite-edge notches spaced along the tie rod to correspond with the spacing between angle bars. One wall of each notch is inclined to mate with and wedge against the inclined wall of the angle bar.

BACKGROUND OF THE INVENTION

In public utility electrical distribution systems, there is an increasing demand for placing residential distribution circuits underground, thus requiring the provision of manholes for the distribution transformers. For this purpose, it has become customary to provide relatively inexpensive manholes of tubular fiber construction of the smallest practical size consistent with providing adequate ventilation to prevent excessive transformer temperature rise. The required ventilation of these underground residential distribution transformers is provided by air circulation through a grating in the manhole cover. Increasing the width of the grate slots obviously increases the air openings and provides improved air circulation, thereby raising the load rating of the transformer. However, increasing the width of the grate slots has the disadvantage of making it easier for minors and other members of the public to tamper with the transformer, and has made it necessary to use a tamper shield below the grate.

Circulation in the manhole may also be improved by the use of a baffle to produce a down-draft effect, but if wider grate slots be used to increase further the circulation, the wider slots make it necessary to use a tamper shield, as mentioned above. Wider slots also permit an increased accumulation of debris, which introduces further maintenance problems.

SUMMARY OF THE INVENTION

The object of the present invention is to provide, for a transformer manhole in an underground residential power distribution system, a manhole grate of simple and inexpensive design which, without the use of either a tamper shield or a down draft baffle, provides a substantial improvement in air circulation, thereby substantially increasing the load rating of the transformer in the manhole.

The above object is accomplished by providing a manhole grate which includes a series of closely-spaced angle bars so oriented angularly, relative to the longitudinal axis of the angle bar, that the two edges of each angle bar are in the same vertical plane, and that this vertical plane is closely spaced from the vertical plane of the vertex of the adjacent angle bar, thereby providing a very narrow vertical-plane opening while at the same time providing an angular opening of substantial width for circulation of air. The angle bars are held together by tie rods having specially shaped notches at opposite edges, at spacings along the tie rods corresponding to the spacings between the angle bars. During assembly of the grate, the tie rods are passed through openings in the angle members and are then rotated through 90° to a position in which the tie rod is wedged tightly in the opening of each of the angle bars of the series.

BRIEF DESCRIPTION OF THE DRAWINGS

FIG. 7 is a front elevational view of the top portion of a fiber tube manhole showing a modified form of grate;

FIG. 8 is a side elevational view of an edge portion of the grate of FIG. 7;

FIG. 9 is a view looking along the line IX—IX of FIG. 8;

FIG. 10 is a view looking along the line X—X of FIG. 8;

FIGS. 11, 12 and 13 are views generally similar to FIGS. 5, 6 and 2, respectively, but showing a modified form of angled bar and tie rod.

DESCRIPTION OF THE PREFERRED EMBODIMENTS

Figure 1:
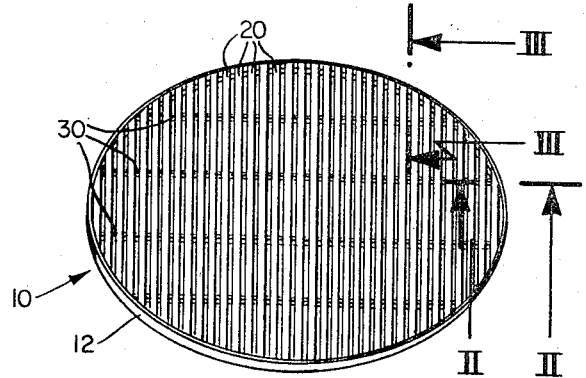
FIG. 1 is a perspective view of a manhole grate according to the present invention.

FIG. 1 shows a perspective view of one form of manhole grate 10 of the present invention. The grate 10 is shown to comprise a circular steel rim 12, a plurality of closely-spaced steel angle bearing-bars 20, and a plurality of steel tie rods 30, four tie rods 30 being shown. The tie rods 30, which run orthogonally relative to the angle bars 20, pass through holes in the angle bars, as will be further described.

Figure 3:
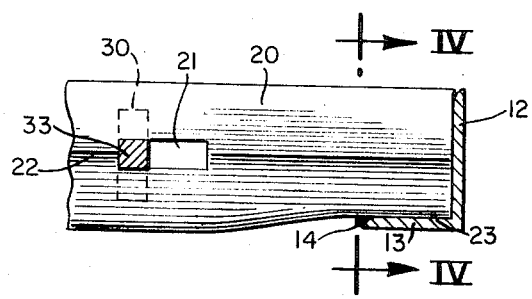
FIG. 3 is a side elevational view of an edge portion of the grate of FIG. 1, looking along the line III–III of FIG .1.
Figure 4:
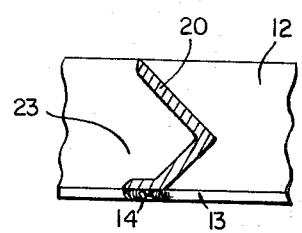
FIG. 4 is a view looking along the line IV–IV of FIG. 3.

As shown in FIG. 3, the angle bars 20 rest on and are supported by the circular rim 12. Preferably, as shown in FIGS. 3 and 4, the edge portion 23 at the end of the angle bar 20 is turned inwardly to form a flat surface for engagement with the flange portion 13 of the rim 12. The angle bar 20 is then welded to the flange 13, as at 14.

Figure 5:
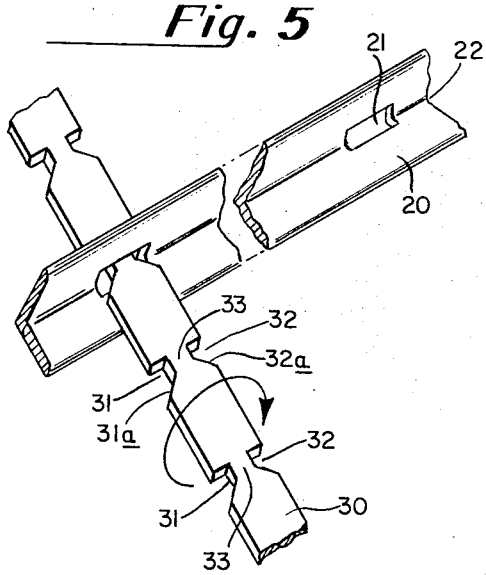
FIG. 5 illustrates the manner of assembly and shows how the tie rod is initially inserted through the opening in the angle bar.
Figure 6:
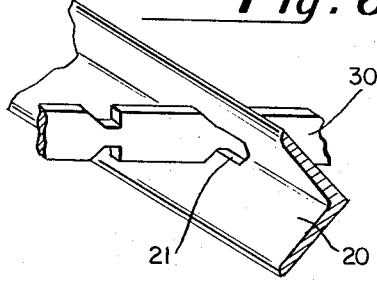
FIG. 6 shows how the tie rod becomes wedged in the opening of the angle bar when the tie rod is rotated 90° from the position shown in FIG. 5.

Referring now to FIGS. 3, 5 and 6, each angle bar 20 is provided along its length, in the vertex region of the bar, with a series of spaced openings or slots 21, shown to be of rectangular shape. The longer dimension of the rectangular opening or slot 21 is in the lengthwise direction of the angle bar. The tie rods 30 are of rectangular cross section, of a size and shape corresponding to that of the slots 21 but sufficiently smaller to be passed with clearance through the slots 21 during assembly of the grate.

The tie rods 30 are provided, at spacings along their length corresponding to the spacings between angle bars 20, with specially shaped notches 31 and 32, at opposite edges of the tie rod, forming therebetween the neck portion 33. The width of the neck portion 33 is related to the height of the opening 21. Preferably, the width of the neck 33 is equal to the shorter dimension of slot opening 21, so that when the neck 33 is in the hole 21 and the rod is turned 90°, in its final position there will be a press fit between the edges of the neck 33 and the adjacent edges of the hole 21. This 90° rotation of the rod 30 is begun with the neck 33 approximately centered in the hole 21, as illustrated in FIG. 5, and is accomplished forcefully, so that the lateral edges of the opening 21 and of the neck 33 will thereby be mutually deformed to permit the rotation. The tie rod 30 may then be pushed laterally so that the neck 33 is at one side of the slot 21 as illustrated in FIG. 3.

Figure 2:
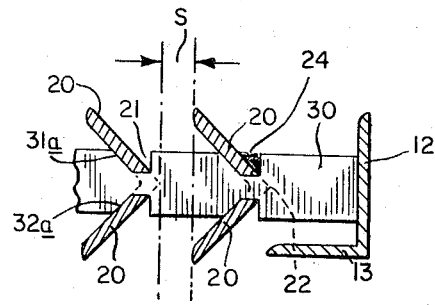
FIG. 2 is a front elevational view of an edge portion of the grate of FIG. 1, looking along the line II–II of FIG. 1.

In the form shown in FIGS. 1–10, the opposed notches 31, 32 of tie rod 30 are each provided with an inclined wall 31a and 32a, whose angular relationship to the axis of the tie rod is 45° so that the inclined edges of the opposing notches 31, 32 mate with and wedge firmly against the inner surface of the legs of the angle bar 20, as seen in FIGS. 2 and 6. A second edge of the notch is at generally right angles to the edge of the rod and functions as a stop. As shown in FIG. 3, the tie rod 30 is preferably placed in a corner position in the opening or slot 21.

In the final assembled form, the width of the spacing S (FIG. 2) between the vertical plane of the vertex of one angle bar 20 and the vertical plane of the edges of the next adjacent angle bar 20 is relatively narrow, being in a typical case of the order of ¼". The width of the space available between angle bars for air flow is, however, substantially larger being, in the typical case referred to, about ¾".

FIG. 7 illustrates a slightly modified form of grate 40 in place on a tubular fiber manhole 50, the upper portion of which is shown in section in side elevation. The fiber tube manhole 50 is provided at its upper end with an internal flange 51 and external collar 52. The collar 52 extends above the upper end of the fiber tube, and in combination with the flanged upper end of the fiber tube forms a receptacle for the rim 42 of the circular grate 40.

In the form illustrated in FIGS. 7–10, the rim 42 of the grate 40 is a circular U-shaped channel member, rather than a circular L-shaped angle member as in FIGS. 1–6. As shown in FIGS. 8 and 10, both edges of the angle bearing bars 60, at each end thereof, are turned inward to form flat surfaces for engagement with both the upper and lower flat interior surfaces of the U-shaped channel rim 42. Spot welds may be placed at the end edges of the channel member 42, as indicated by the reference numbers 43 and 44 in FIGS. 8 and 10.

A further modification illustrated in FIGS. 7–10, as compared with the form shown in FIGS. 1–6, is that the upper and lower edges of the generally rectangular slot or openings 61 in the angle bars 60 are provided with arcuate recesses 61a at the central portion, forming a circular hole allowing easy 90° rotation of the neck 33 of the tie rod 30. After rotation, the tie rod 30 is pushed to a corner portion of the generally rectangular slot 61. In this form, the width of the neck 33 of the tie rod 30 may preferably be so related to the height of the slot 61 at the narrow end portions thereof that the neck 33 of the rod 30 has a press or interference fit in the end portion of the slot.

Without intending to limit the manhole grate of the present invention to any particular size, and merely for the purpose of completing the description of one preferred embodiment, the following dimensions are given as of interest: The fiber tube manhole 50 has a 3-foot interior diameter; the walls of the fiber manhole are 0.48" thick; the interior flange 51 and the external collar 52 are each 0.48" thick; the U-shaped channel rim 42 is ⅛" steel; the exterior dimension is 1⅜" high and the interior is 1⅛" high as viewed in FIG. 8; the angle bar 60 is ⅛" thick mild steel; the overall height of the angle bar in its assembled position is 1.415"; the slot 61 is 21/32" long and ¼" high; the circular opening at the center of the rectangular slot 61 is 11/32" diameter; the horizontal dimension from the vertex of an angle bar to the edge thereof, in assembled position, is 11/16"; the tie rod 30 is steel ¼" thick and ⅝" wide; the width of the neck 33 of the tie rod is about ¼"; the length of the neck is 3/16"; the inclined wall of the notch is at angle of 45°; the tie rods 30 are on 6" spacing in the assembled grate; the outside diameter of the grate is 36¾".

In summary, it will be seen that the manhole grate of the present invention in the form shown in FIGS. 1–10 consists of an array of angle bearing-bars arranged with the outer edges of their angle legs disposed in respective uniformly spaced parallel vertical planes and having their ends fixed to an enclosing circular rim, which may be either a channel band or an angle band. A transverse series of spaced parallel tie rods interlock with the angle bearing-bars, with the ends of the tie rods preferably resting on or fixed to the circular rim. The tie rod is of rectangular oblong transverse section and is provided with symmetrical bilateral notches each having one side wall normal to the longitudinal edge of the tie rod, a bottom surface parallel to that edge, and the other side wall at a 45° angle to that edge. The angle bars are provided with spaced longitudinal rectangular oblong slots through the vertex of each angle bar for receiving the tie rods.

The grate is assembled by inserting the tie rods flatwise through aligned slots in the angle bars to a position such that the bottom edge of the bilateral notches are disposed within the slot. The tie rods are rotated 90°, and then pushed laterally to one end of the slot. The ends of the angle bars are welded to the circular rim, and the tie rods may also be so welded. Before welding, the ends of the angle bars are bent inwardly to cause the top surface of the angle bars of the grate to be at the same level as the top of the rim. The grate may be galvanized for corrosion resistance. Rigidity may be improved or assured by tack-welding at some or all of the grid interconnections, as indicated by the reference character 24 in FIG. 2.

In the grate constructed as described herein, the spacing between the vertical plane of the vertex of one angle bar and the vertical plane of the outer edges of the adjacent angle bar is much smaller than the horizontal distance between correspondingly similar points on adjacent angle bars. In this way, a very substantial percentage of the total grate area is available for air circulation while the percentage of grate area available for tampering is very substantially less.

The manhole grate of FIGS. 7–10 may obviously be used in either of two positions, i.e., it may be inverted. For the device of FIGS. 1 to 4, it has been indicated that the flange portion 13 of the rim 12 forms the supporting base of the gate 10, but it should be understood that this form of grate may also be used in inverted position, in which case the flange 12 forms an angular flat band whose top surface may be more or less level with the top edges of the angle bars 20, and the angle bars rest on the upper edge of the manhole. This is not objectionable where the manhole is concrete.

The peripheral rim of the grate helps to prevent laceration of the abutting surfaces of the fiber tube manhole by the edges or ends of the bearing bars and tie rods, but if the grate is used on manholes having concrete or similar durable hard seating surfaces, the rim may be omitted. In such cases, it will be desirable to apply the tack welds 24 at a substantial percentage of the intersections of the bearing bars and the rods, particularly including those adjacent the periphery of the grate.

Although the manhole grate illustrated in FIGS. 1–10 and described thus far has been described as being of circular shape to cover a tubular manhole opening, it is to be understood that the grate may be of any desired shape. For example, it may be square to cover the square concrete manholes now in conventional use for underground residential distribution service.

Also, while the transverse shape of the angle bearing bars 20 and 60 of FIGS. 1–10 is illustrated and described as having a dihedral angle of 90°, this dihedral angle may be of any desirable effective value other than 90°.

In the modified form shown in FIGS. 11–13, the dihedral angle of the angle bar 120 is 135° (or approximately 135°) with the angle bar 120 so disposed that, as seen in FIG. 13, the lower leg is vertical and the upper leg is at 45° relative to the vertical. The spacing S' between the vertex of one angle bar and the upper end of the adjacent angle bar is the same, or substantially the same, as that of spacing S of FIG. 2. As compared with the form shown in FIGS. 2–6, the form shown in FIGS. 11–13 facilitates air flow and manhole ventilation with but little loss in the anti-tampering characteristics of the grate. The notches 131 on one side of the tie rod 130 have an inclined wall 131a which, when the tie rod of FIG. 11 is rotated clockwise through 90°, abuts against the upper inclined leg of the angle bar 120, as seen in FIGS. 12 and 13. The notches 132 on the opposite edge of the tie rod 130 are rectangular and of a size to fit over the lower vertical leg of the rod. The tie rod and angle bar may be secured as by spot welding as at 124 in FIG. 13.

While the preferred embodiments of this invention have been described in some detail, it will be obvious to one skilled in the art that various modifications may be made without departing from the invention as hereinafter claimed.

What is claimed is:

1. A manhole grate comprising:
   (a) a plurality of angle bars having inner and outer surfaces, said bars being arrayed in spaced parallel horizontal relation having upwardly disposed legs uniformly inclined to the horizontal;
   (b) each angle bar being provided at spaced longitudinal intervals with transverse slots in the vertex region of the bar;
   (c) the slots in the respective bars being in transverse register;
   (d) a plurality of tie rods extending transversely through said slots in said angle bars;
   (e) each of said tie rods having at spaced intervals along its length transversely-aligned notches at opposite edges forming therebetween a reduced neck portion of a width capable of being vertically disposed with a press fit in the slots of the angle bars;
   (f) each notch along at least one edge of each of said tie rods having one wall inclined and mating with and wedging against the inner surface of an angle bar;
   (g) another wall of each notch engaging the outer surface of said angle bar and functioning as a stop;
   (h) the neck portions of said tie rods being engaged in the respective slots of said angle bars with the width of said neck portions in vertical position.

2. A manhole grate according to claim 1 characterized in that the tie rods are rectangular in cross section, and in that the openings in the angle bars are also generally rectangular.

3. A manhole grate according to claim 2 characterized in that the generally rectangular openings in the angle bars are provided with recesses in the center portion of the upper and lower edges of the openings to allow for 90° rotation of the tie rod during assembly.

4. A manhole grate according to claim 2 characterized in that the upward legs of the angle bars and the inclined walls of the notches are at an angle of 45° relative to the longitudinal axes of the tie rods.

5. A manhole grate according to claim 4 characterized in that the legs of the angle bars are inclined 90° with respect to each other.

6. A manhole grate according to claim 4 characterized in that the lower legs of the angle bars are vertically disposed.

7. A manhole grate according to claim 1 characterized in that it includes a peripheral rim having at least one flange and that the end portions of said angle bars are engaged with said rim.

8. A manhole grate according to claim 7 characterized in that at least one edge portion at each end of each angle bar is bent to form a flat surface adjacent the flange surface of said rim.

9. A manhole grate according to claim 8 characterized in that said rim is of channel cross section and in that the opposite edge portions at each end of each angle bar are bent to form flat surfaces adjacent the inner flat surfaces of the flange portions of the rim.

10. A manhole grate comprising:
    (a) a peripheral rim having at least one flange;
    (b) a plurality of angle bars having inner and outer surfaces, said bars being in spaced parallel relation having opposite end portions supported on the flange of said peripheral rim;
    (c) the angle bars being so positioned that the lateral edges of each of the angle bars are in the same vertical plane;
    (d) each of said angle bars being provided at spaced intervals along its length with slots at the vertex region of the bars;
    (e) a plurality of tie rods extending transversely through said slots in said angle bars;
    (f) each of said tie rods having at spaced intervals along its length transversely-aligned notches at opposite edges of the rod forming therebetween a reduced neck portion of a width capable of being vertically disposed in the slot of the angle bar;
    (g) one wall of each notch being so inclined as to mate with and wedge against the inner surface of an angle bar;
    (h) another wall of each notch engaging the outer surface of said angle bar and functioning as a stop.

11. A manhole grate according to claim 10 characterized in that the slots through the angle bars are generally rectangular, being longer than high, and further characterized in that the tie rods are of corresponding rectangular cross section of a size to pass with clearance through said slots during assembly of the grate, to allow positioning of the neck portion of the tie rod at the slot and rotation thereof through 90°.

12. A manhole grate according to claim 11 characterized in that each of the generally rectangular slots through the angle bars is provided with a circular recess at the center portion of the slot to allow for 90° rotation of the tie rod during assembly.

13. A manhole grate according to claim 12 characterized in that the rim is of channel cross-section and in that opposite edge portions at each end of each angle bar are turned inwardly to form flat surfaces adjacent the inner flat surfaces of the flange portions of the rim.

14. A manhole grate according to claim 10 characterized in that the legs of the angle bars are inclined 90° to each other, and in that the inclined walls of the notches are at an angle of 45° relative to the longitudinal axis of the tie rod.

References Cited

UNITED STATES PATENTS

| 91,307 | 6/1869 | Carpenter | 52—669 |
| 1,132,021 | 5/1915 | Mark | 52—667 |
| 2,112,949 | 4/1938 | Bunker | 52—669 |
| 2,245,908 | 6/1941 | Drake | 52—667 |
| 2,421,743 | 6/1947 | Cartter | 52—656 |

FOREIGN PATENTS

| 946 | 1904 | Great Britain. |
| 831,522 | 2/1952 | Germany. |

HENRY C. SUTHERLAND, Primary Examiner

U.S. Cl. X.R.

52—667